United States Patent
Spoon

[11] Patent Number: 5,697,417
[45] Date of Patent: Dec. 16, 1997

[54] HANDLE FOR LIFTING AND LOCKING EXTENSIBLE AWNING SUPPORT ARM

[75] Inventor: Vito Spoon, Roslindale, Mass.

[73] Assignee: Recreation Vehicle Products, Inc., Wichita, Kans.

[21] Appl. No.: 592,566

[22] Filed: Jan. 26, 1996

[51] Int. Cl.[6] .................................................. E04F 10/06
[52] U.S. Cl. .................................................. 160/71; 160/80
[58] Field of Search .................................. 160/66, 67, 68, 160/69, 71, 78, 80, 22, 405; 135/88.11, 88.12

[56] References Cited

U.S. PATENT DOCUMENTS

| | | | |
|---|---|---|---|
| 4,117,876 | 10/1978 | Bennett | 160/80 X |
| 4,253,689 | 3/1981 | McKee | 160/67 X |
| 4,508,126 | 4/1985 | Everard | |
| 4,719,954 | 1/1988 | Curtis et al. | 160/71 X |
| 4,819,706 | 4/1989 | Quinn | 160/80 X |
| 5,148,848 | 9/1992 | Murray et al. | 160/71 X |
| 5,172,743 | 12/1992 | Wallace | |

*Primary Examiner*—David M. Purol
*Attorney, Agent, or Firm*—Shook, Hardy & Bacon L.L.P.

[57] ABSTRACT

A lift handle assembly is mounted on a support arm of a awning of the type used on recreational vehicles. The lift handle assembly is used to facilitate extension of the support arm to achieve the desired length for the support arm and then locks the support arm segments together in a manner which can be released only by performing three separate steps.

18 Claims, 2 Drawing Sheets

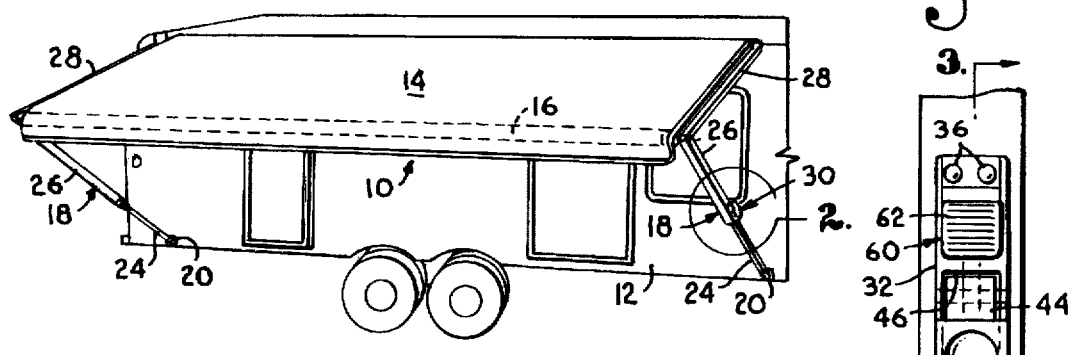
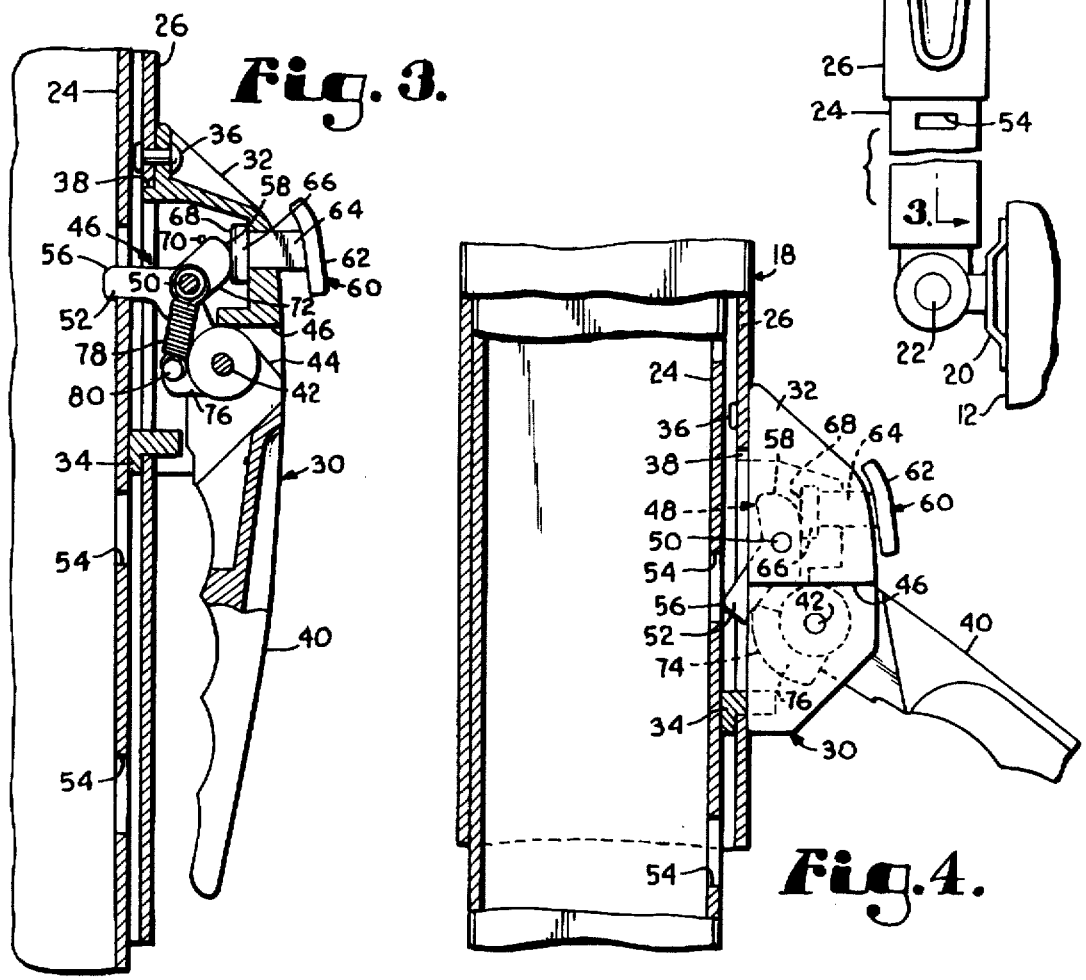

HANDLE FOR LIFTING AND LOCKING EXTENSIBLE AWNING SUPPORT ARM

BACKGROUND OF THE INVENTION

The present invention relates in general to an awning, such as used with recreational vehicles or other support surfaces, and, more particularly, to a lift handle used for extending a telescoping support arm for the awning and locking the support arm at the desired length.

Awnings of the type used with recreational vehicles typically comprise a canopy connected at one end to the side of the vehicle and fixed at the other end to a self-retracting roller bar. A pair of extendable support arms placed at opposite ends of the roller bar support the weight of the roller bar and canopy when the awning is deployed. Each support arm is secured at one end to the roller bar and is typically pivotally connected at the other end to a bracket mounted on a lower portion of the side of the vehicle. When the awning is stored, the support arms extend upwardly along the side of the vehicle, and the roller bar about which the canopy is wound is held against the vehicle side near the roof. Any of various types of locking mechanisms may be used to prevent inadvertent release of the awning and unwinding of the canopy when in the stored position.

When deployment of the awning is desired, the locking mechanism is released and the roller bar is pulled downward and outwardly to cause unwinding of the canopy. The support arms pivot away from the vehicle as the roller bar is lowered and a pair of braces may be extended to engage and stabilize the roller bar. The support arms are then extended to raise the roller bar and canopy to the desired position and a locking pin is inserted through telescoping segments of the support arms to lock the support arms at the desired length. In some instances, one or both of the support arms may be detached from their mounting brackets on the side of the vehicle and placed in an upright position on the ground.

Because of the weight of the roller bar and canopy, a lift handle is often positioned on the extendable segment of each support arm to facilitate grasping and lifting of the support arm. One conventional type of lift handle is pivotally mounted on the extendable arm segment and is connected to a spring-loaded pin which is used to lock together the telescoping segments of the support arm. When the handle is pivoted against the support arm, the pin is positioned in one of a number of spaced apart openings provided in the stationary support arm segment. The pin thus locks the arm segments together to prevent extension and retraction of the support arm. When extension or retraction of the support arm is desired, the handle is pivoted away from the support arm to release the pin from the opening in the stationary support arm. The extendable arm segment may then be moved in relation to the stationary arm segment to increase or decrease the length of the support arm as desired.

One problem associated with the above-described lift handle is the locking pin must be aligned for insertion into the opening before the handle can be pivoted against the support arm to lock the support arm at the desired length. In addition to the difficulties in visually or otherwise determining when the locking pin is aligned with the receiving opening, the user must then shift the lifting force from the handle to another portion of the support arm before pivoting the handle against the support arm. Extension and locking of the support thus require considerable dexterity and are not readily accomplished by inexperienced individuals.

Another problem with the lift handle described above is the locking pin can be released if the handle is inadvertently pivoted away from the support arm. When the awning is deployed, this release of the locking pin can cause partial collapse of the awning with potential injury to individuals who may be standing under the awning. In an attempt to reduce the opportunity for accidental release of the locking pin, a secondary safety pin has been utilized to prevent accidental removal of the locking pin. The safety pin, however, may not always be used, such as when it has been lost or misplaced. In other instances, the individual may be distracted and forget to install the safety pin because he or she is concentrating on the awkward task of aligning the locking pin with the receiving opening while supporting the weight of the awning.

A need has thus developed for a lift handle having a locking mechanism which is more readily engaged and is less likely to be inadvertently released and which otherwise overcomes the disadvantages described above.

SUMMARY OF THE INVENTION

It is an object of this invention to provide a lift handle having a locking mechanism which is not released simply by pivoting movement of the lift handle so that the locking mechanism is less likely to be inadvertently released with resulting collapse of the awning and possible injury to bystanders.

It is also an object of this invention to provide a lift handle having a locking mechanism which requires multiple steps to release so that the opportunity for inadvertent release of the locking mechanism is greatly reduced.

It is another object of this invention to provide a lift handle having a locking mechanism as described which does not rely upon safety components which can be separated from the lift handle so that the safety features of the locking mechanism are not defeated by misplacement or nonuse of the safety components.

It is a further object of this invention to provide a lift handle having a locking mechanism as described which can be readily operated with one hand so that the lift handle is easy to operate even by inexperienced individuals.

It is a still further object of this invention to provide a lift handle having a locking mechanism which automatically engages during extension of the support arm so that visual alignment of the locking mechanism is not required.

It is a yet further object of this invention to provide a lift handle having a locking mechanism as described which automatically engages even while the handle is pivoted away from the support arm so that the weight load carried by the handle does not need to be transferred to another portion of the support arm before the locking mechanism can be engaged.

To accomplish these and other related objects of the invention, in one aspect the invention is related to a lift handle assembly for mounting on an extendable support arm for an awning, said lift handle assembly comprising a base constructed for mounting on the support arm; a toggle coupled with the base and moveable between an engaged position inserted in an opening in the support arm to prevent extension of the support arm and a released position withdrawn from said opening to permit said extension of the support arm; a handle coupled with the base and moveable between a stored position and a deployed position, said handle being in operative engagement with the toggle when in the stored position to prevent movement of the toggle from the engaged position to the released position, said operative engagement being removed to permit said movement of the toggle between the engaged and released positions when the handle is moved to the deployed position; and a release member coupled with the base and operable to move said toggle from the engaged position to the released position when the handle is moved to the deployed position.

In another aspect, the invention is related to a method of the using the lift handle assembly to extend and retract the support arm and then lock the support arm at the desired length.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a perspective view of a recreational vehicle and an awning employing a lift handle assembly of the present invention;

FIG. 2 is a fragmentary, elevation view of the lift handle assembly and telescoping support arm taken generally within the circle designated with the numeral 2 in FIG. 1;

FIG. 3 is a fragmentary, side elevation view of the lift handle assembly and support arm taken in vertical section along line 3—3 of FIG. 2 in the direction of the arrows, the lift handle assembly being shown in a locked position;

FIG. 4 is a fragmentary, side elevation view of the lift handle assembly and support arm, the lift handle assembly being shown in a released position with broken lines illustrating the positioning of internal components and the support arm being shown with portions broken away for purposes of illustration;

DESCRIPTION OF THE PREFERRED EMBODIMENTS

Figure 5:
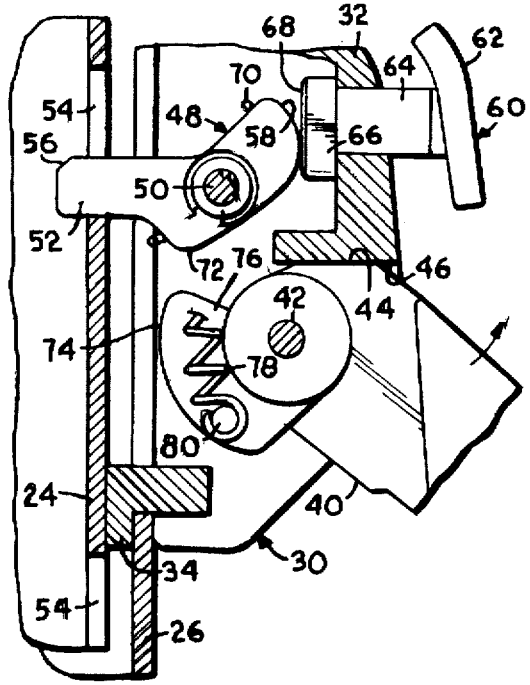
FIG. 5 is a fragmentary, side elevation view of the lift handle assembly taken in vertical section, the view being similar to that shown in FIG. 3 but on an enlarged scale and with portions broken away for illustration purposes and the handle being pivoted to a released position.

Referring now to the drawings in greater detail and initially to FIG. 1, an awning 10 is shown applied to a side of a recreational vehicle 12. Awning 10 comprises a canopy 14 of vinyl or other fabric or material which is secured at one end to the vehicle 12 and at the other end to a roller bar 16. The roller bar 16 extends the length of the awning 10 and is used to wind up the canopy 14 when it is stored against the side of the vehicle. The details of the attachment of the canopy 14 to the vehicle 12 and the roller bar 16, as well as the operation of the roller bar 16 itself, are well known to those of ordinary skill in the art and need not be described herein.

The awning 10 also includes a pair of extendable support arms 18 positioned at opposite ends of the roller bar 16 to support the roller bar 16 and canopy 14 at the desired position. One end of each support arm 18 is connected to a respective end of the roller bar 16 and is connected at the other end to a bracket 20 mounted at a lower portion of the side of vehicle 12. As can best be seen by looking additionally at FIG. 2, the support arms 18 are connected to the brackets 20 in a manner which allows the support arms 18 to be pivoted about pivot pin 22 between an upright storage position along the side of the vehicle and a deployed position in which the support arms extend at an angle to the vehicle side. One or both of the support arms 18 may also be releasable from the brackets 20 to allow the support arms to be deployed in an upright position with the lower end of the support arms resting on the ground.

Each support arm 18 comprises at least two telescopically associated segments 24 and 26 which permit the longitudinal length of the support arm 18 to be varied as desired during storage and deployment of the awning. Both segments 24 and 26 are generally channel-shaped and are formed of suitably rigid materials such as metals. Segment 24 forms the lower portion of the support arm 18 and is slidably received within the upper, outer segment 26. The lower segment 24 is retracted within the upper segment 26 when the support arm 18 is in the upright storage position. When the awning 10 is deployed, each support arm 18 swings away from the vehicle 12 about the axis of the pivot pin 22 and the upper segment 26 may be extended in relation to the lower segment 24 to increase the resulting length of the support arm 18. Further details of the mechanism for locking the support arm segments 24 and 26 at the desired length will be described below.

The awning 10 may further include braces 28 pivotally mounted at one end to the side of the vehicle 12 near the roof. The other end of each brace 28 engages a respective support arm 18 near the roller bar 16. The braces 28 operate to resist movement of the support arms 18 such as when the canopy 14 is subjected to wind loads. Each brace 28 is typically stored flat against the side of the vehicle 12 and may be received within a channel (not shown) in the associated support arm 18 for a more compact appearance. Again, the details of construction and operation of the braces 28 are well known and need not be described herein.

Turning now to FIGS. 2–8, the present invention is directed to a lift handle assembly 30 which is mounted on one or both support arms 18 to facilitate the extension and retraction of the support arm segments 24 and 26 and to lock the support arm segments at the desired length. Each lift handle assembly 30 is preferably mounted on the side of the support arm 18 that faces away from the canopy 14 so that an individual need not stand under the canopy 14 to operate the lift handle assembly. It will be appreciated that placement of the lift handle assembly on the opposite or adjacent sides of the support arm 18 may be utilized if desired.

Each lift handle assembly 30 comprises a base 32 which is secured to the outer support arm segment 26 in a suitable fashion. As illustrated, the base 32 is mounted over an opening in the sidewall of the outer segment 26 and is retained in place by a lower flange 34 which grips the undersurface of the sidewall adjacent the opening and upper rivets 36 which extend through the base and sidewall. An upper flange 38 formed in the base 32 abuts the edge of the sidewall opening and cooperates with the lower flange 34 to prevent lateral displacement of the base 32.

The lift handle assembly 30 also includes a handle 40 which is mounted for pivoting movement on a pivot pin 42 which is secured to base 32. The handle 40 is elongated and contoured for grasping by an individual's hand. The handle 40 is normally maintained in a stored position in generally parallel alignment with the support arm 18. The handle 40 may be pivoted as shown in FIG. 4 to an engaged position in which it extends at an angle to the support arm 18 to facilitate grasping and exertion of a lifting force on the upper support arm segment 26. A generally flat eccentric portion 44 of the handle 40 is located adjacent the pivot pin 42 and abuts a broad stop 46 formed in the base 32 to prevent further movement of the handle away from the support arm once the preselected engaged angle is reached.

The lift handle assembly 30 further includes a toggle 48 which is pivotally mounted on a pin 50 fixed to base 32. The toggle 48 includes a tongue 52 which extends through the opening in the sidewall of the outer support arm segment 26. The tongue is removably positionable in a series of spaced apart cutouts 54 formed in the underlying sidewall of the inner support arm segment 24 to lock together the inner and outer segments. A bevel 56 is provided at the upper forward edge of the tongue to provide additional clearance as the tongue 52 is pivoted into the cutouts by pivoting movement of the toggle 48 about pin 50.

The number and location of the cutouts 54 can be varied as desired to provide the desired range of resulting lengths for the support arm 18. The cutouts 54 have a longitudinal dimension roughly twice that of the tongue 52 to permit the tongue to be pivoted into and out of the cutouts 54. This difference in longitudinal dimension allows for slight extension and retraction of the outer support arm segment 26 in relation to the inner support arm segment 24 but the segments are otherwise locked together against further extension or retraction when the tongue 52 is inserted into one of the cutouts 54. It will be appreciated that this locking function can be accomplished by utilizing detents rather than cutouts 54 or by using other mechanisms which cooperate to lock and release the support arm segments. This is contemplated by and is within the scope of the invention.

The toggle 48 also includes a cam surface 58 which is spaced rearwardly from the tongue 52 and engages a release member 60 mounted on the base 32. The release member 60 includes a push button 62 which is positioned for engagement by the thumb of the individual while grasping the handle 40 with the same hand. The push button 62 is positioned exteriorly of the base 32 and is connected to one end of a shank 64 which extends through the outer wall of the base 32 and is connected at the other end to a base pad 66 located interiorly of the base 32. The base pad 66 has a surface 68 which faces and engages the camming surface 58 on the toggle 48.

The release member 60 is located in relation to the pivot axis of the toggle 48 such that depressing the push button 62 transmits a directional rotational force to the toggle 48. The rotational force transmitted to the toggle 48 urges movement of the tongue 52 toward the edge of the cutout 54 on which the tongue rests when the support arm 18 is supporting the weight of the awning 10, i.e. a counterclockwise direction as viewed in FIG. 3. The rotational force exerted by depressing the push button 62 is thus resisted by and is insufficient to overcome the weight force which is normally carried by the tongue 52. To permit the rotational force to overcome the weight force when releasing the tongue from the cutout 54, the handle 40 is pivoted to the deployed position and lifted to relieve the weight force exerted on the tongue 52.

Figure 6:
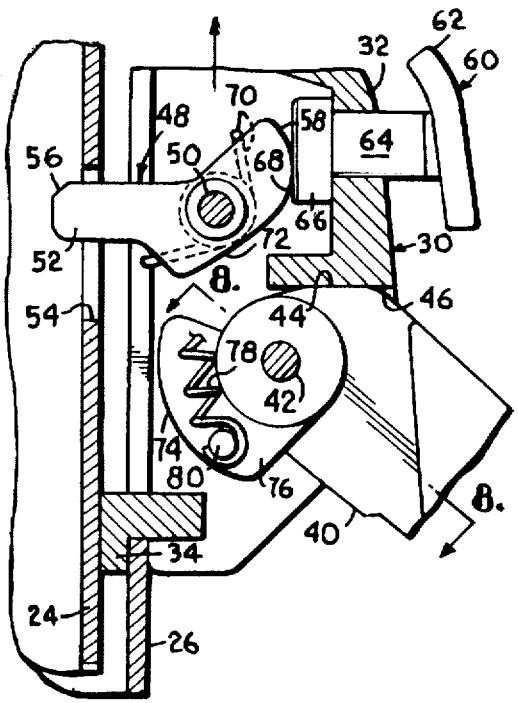
FIG. 6 is a fragmentary, side elevation view similar to that shown in FIG. 5 but with the outer support arm and lift handle assembly being raised slightly in relation the inner support arm.

As can best be seen in FIG. 6, a rotational biasing force is exerted on the toggle 48 by a torsion spring 70 mounted on the same pivot pin 50 that mounts the toggle. The torsion spring 70 is positioned so that the biasing force is exerted on the toggle in a rotational direction opposite the rotation force exerted by depressing the push button 62, i.e. clockwise as viewed in FIG. 6. The torsion spring thus urges the toggle from the released to the engaged position with the tongue 52 inserted into the cutout 54. Further movement of the toggle in this direction is blocked by contact of the base pad 68 against the undersurface of the outer wall of base 32.

Turning again to FIG. 3, release of the tongue 52 from the cutout 54 is blocked by contact between a generally flat surface 72 on toggle 48 and an arcuate facing surface 74 on an ear 76 positioned on handle 40 near pivot pin 42. When the handle 40 is in the stored position aligned with the support arm 18, the arcuate surface 74 on the handle contacts the flat surface 72 on the toggle to prevent rotation of the toggle from the engaged to the released position. The handle is itself blocked from rotating further in the direction of the stored position by contact of the ear 76 against the forward edge of stop 46. When the handle 40 is swung to the deployed position, the arcuate surface 74 is pivoted away from contact with flat surface 72 on the toggle. The toggle may then be rotated to the released position by lifting the handle 40 and depressing the push button 62 as illustrated sequentially in FIGS. 5–7.

The handle 40 is biased toward the stored position by an extension spring 78 which is connected at one end to toggle pivot pin 50 and at the other end to a post 80 provided on ear 76. The force exerted by the extension spring 78 should be sufficient to return the handle 40 from the deployed position to the stored position when it is released by the individual deploying the awning 10. The spring force, however, should be easily overcome to permit ready movement of the handle from the stored position to the deployed position.

In use, the lift handle assembly 30 operates to facilitate extension of the support arm segments 24 and 26 to achieve the desired length for the support arm 18 and then locks the support arm segments together in a manner which can be released only by performing three separate steps.

Figure 7:
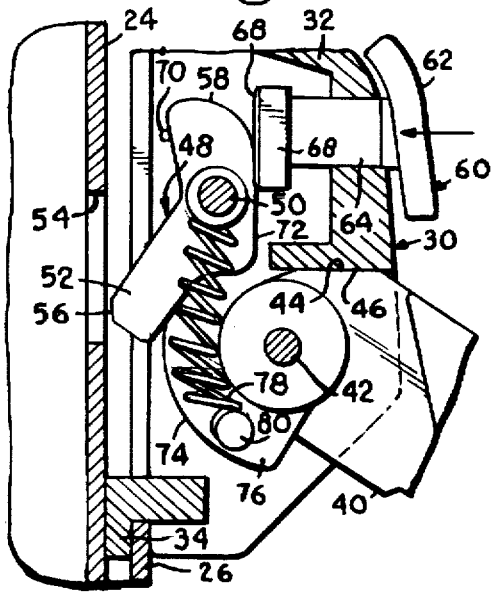
FIG. 7 is a fragmentary, side elevation view similar to that shown in FIG. 6 but with the push button shown depressed to allow release of the toggle which locks together the outer and inner support arms.
Figure 8:
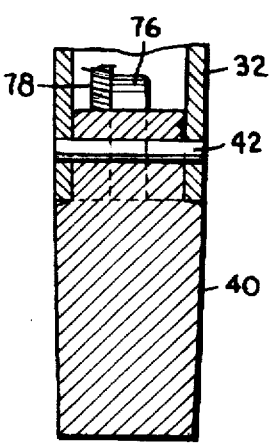
FIG. 8 is an elevation view of a portion of the lift handle assembly taken in section along line 8—8 of FIG. 6.

Operation of the lift handle assembly 30 to achieve retraction of the support arm 18 is illustrated sequentially in FIGS. 5–7. As shown in FIG. 5, the handle 40 is first pivoted from the stored position aligned with the support arm 18 to a deployed position extending at a preselected angle to the support arm. The handle 40 is prevented from moving beyond the preselected angle by contact of the eccentric 44 against the stop 46 formed in the base 32. Movement of the handle 40 to the deployed position pivots the arcuate surface 74 from contact with the corresponding flat surface 72 on the toggle 48. As next shown in FIG. 6, a lifting force is applied to the handle 40 to raise the outer support arm segment 26 slightly in relation to the inner segment 24. This movement provides the necessary clearance for the tongue 52 to pivot out of the cutout 54 when the push button 62 is depressed on the release member as shown in FIG. 7. Depressing the push button 62 causes the toggle 48 to rotate and thus move the tongue from the engaged position in the cutout 54 to a released position free of the cutout 54. With the tongue 52 removed from the cutout 54, the support arm segments 24 and 26 may be extended or retracted in relation to each other to vary the length of the support 18.

Once the support arm 18 has been retracted to the desired length, the tongue 52 is reinserted in the corresponding cutout 54 simply by releasing the push button 62. The torsion spring 70 then causes the toggle 48 and tongue 52 to rotate from the released position to the engaged position. Upon release of the handle 40, the extension spring 78 causes the handle to pivot from the deployed position to the stored position, with the arcuate surface 74 on the handle 40 engaging the flat surface 72 on the toggle to prevent release of the tongue 52 from the cutout 54. The tongue 52 then supports the weight carried by the outer support arm segment 26 as it rests on the edge of the cutout 54. The support arm segments 24 and 26 are thus locked together and the locking mechanism cannot be released except by pivoting the handle 40, lifting the handle 40 to both remove the load from the tongue 52 and provide the necessary clearance for release of the tongue from the cutout, and depressing the push button 62 to rotate the tongue 52 out of the cutout 54. It will be appreciated that these separate steps required to cause release of the tongue 52 from the cutout 54 greatly reduces the opportunity for inadvertent release of the locking mechanism and resulting collapse of the awning 10.

Extension of the support arm 18 can be achieved by simply pivoting the handle 40 to the deployed position and applying a lifting force to the handle 40. As the outer support arm segment 26 extends in relation to inner support arm segment 24, the tongue 52 pivots into and out of successively positioned cutouts 54. Because the handle 40 has been pivoted to remove abutment of the arcuate surface 74 with the toggle surface 72, the toggle 48 is able to pivot out of the cutouts 54 during extension of the support arm segments. The torsion spring 70 then automatically returns the toggle 48 to the engaged position when the tongue 52 is aligned with the next cutout 54. This automatic return of the tongue into the cutout is particularly advantageous because it does not require that the user visually align the tongue 52 with the cutout 54 and then return the handle 40 to the stored position as is required with certain conventional lift handles. Instead, the locking mechanism automatically engages while a lifting force is being applied to the deployed handle 40. In addition, the return of the tongue 52 into the sequential cutouts 54 creates a clicking sound which provides an audible indication that the tongue 52 is seated in the cutout 54 and the support arm segments are locked together.

After the tongue 52 is inserted in the cutout 54 and the handle 40 is released, the handle 40 is automatically returned to the stored position by the extension spring 78. The handle 40 thus prevents further extension of the support arm 18 by blocking further pivoting of the toggle 48 between the engaged and released positions as a result of contact between surfaces 74 and 72. The automatic activation of the locking features of the lift handle assembly eliminate the need for the individual deploying the awning 10 to take additional steps to prevent inadvertent release of the locking mechanism. Moveover, all of the components of the lift handle assembly 30 are self contained and cannot be separated without disassembling the lift handle. As a result, the components are always present and cannot become lost or misplaced.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A lift handle assembly mounted on an extendable and retractable support arm for an awning, said lift handle assembly comprising:

a base mounted on the support arm;

a toggle coupled with the base and moveable between an engaged position inserted in an opening in the support arm to prevent retraction of the support arm and a released position withdrawn from said opening to permit said retraction and extension of the support arm;

a handle coupled with the base and moveable between a stored position and a deployed position, said handle being in operative engagement with the toggle when in the stored position to prevent movement of the toggle from the engaged position to the released position, said operative engagement being removed to permit said movement of the toggle between the engaged end released positions to permit extension of the support arm when the handle is moved to the deployed position and an extension force is applied to the support arm; and a release member coupled with the base and operable to move said toggle from the engaged position to the released position when the handle is moved to the deployed position to permit said extension and refraction of the support arm.

2. The lift handle assembly as set forth in claim 1, including a biasing member coupled with said toggle and acting to urge said toggle toward said engaged position.

3. The lift handle assembly as set forth in claim 2, wherein said toggle is mounted for pivoting movement between said engaged and released positions.

4. The lift handle assembly as set forth in claim 3, wherein said release member engages said toggle when the toggle is in the engaged position to block movement of the toggle in a direction away from said released position.

5. The lift handle assembly as set forth in claim 3, wherein said handle is pivotally coupled with the base and including a biasing spring coupled with the handle and acting to urge said handle towards the stored position.

6. The lift handle assembly as set forth in claim 5, wherein said handle is aligned with the support arm when the handle is in the stored position and extends at an angle away from the support arm when the handle is in the deployed position.

7. An extendable support arm for an awning roller bar about which a canopy may be wound, said support arm comprising:

first and second telescopically connected, elongated support arm segments, said first segment being receivable within the second segment and longitudinally extendable and retractable in relation to said second segment to vary the longitudinal length of said support arm, one of said segments being adapted for coupling at a free end with said roller bar and the other of said segments being adapted for placement at a free end on a support surface;

locking elements longitudinally spaced apart on said first segment; and a lift handle assembly mounted on said second segment, said lift handle assembly comprising:

a base;

a toggle coupled with the base and moveable between an engaged position cooperatively engaging one of said locking elements to prevent retraction of the first segment in relation to the second segment and a released position disengaged from said one locking element to permit said extension and retraction of the first segment;

a handle operatively coupled with the toggle and moveable between a stored position and a deployed position, said handle being in operative engagement with the toggle when in the stored position to prevent movement of the toggle from the engaged position to the released position, said operative engagement being removed to permit said movement of the toggle between the engaged and released positions to permit extension of the first support arm segment in relation to the second segment to increase the longitudinal length of the support arm when the handle is moved to the deployed position and an extension force is applied to the support arm; and a release member operatively coupled with the toggle and operable to move said toggle from the engaged position to the released position when the handle is moved to the deployed position to permit said extension and retraction of the support arm.

8. The support arm as set forth in claim 7, wherein said locking elements comprise spaced apart cutouts in a wall of the first segment and wherein said toggle extends within one of said cutouts when the toggle is in the engaged position.

9. The support arm as set forth in claim 8, wherein said lift handle assembly includes a biasing member coupled with said toggle and acting to urge said toggle toward said engaged position.

10. The support arm as set forth in claim 9, wherein said toggle is mounted for pivoting movement between said engaged and released positions.

11. The support arm as set forth in claim 10, wherein said release member engages said toggle when the toggle is in the engaged position to block movement of the toggle in a direction away from said released position.

12. The support arm as set forth in claim 11, wherein said handle is pivotally coupled with the base and said lift handle assembly includes a biasing spring coupled with the handle and acting to urge said handle towards the stored position.

13. The support arm as set forth in claim 12, wherein said handle is aligned with the support arm when the handle is in the stored position and extends at an angle away from the support arm when the handle is in the deployed position.

14. A process for adjusting the length of a support arm of an awning and locking the support arm at variable preselected lengths, said support arm comprising telescoping segments and having a lift handle assembly mounted thereon, said process comprising the steps of:

(a) decreasing the length of said support arm by;
moving a handle portion of said assembly from a stored to a deployed position to remove operative engagement of the handle with a toggle which is moveable between an engaged position inserted in one of a series of openings in the support arm to prevent retraction of the segments together and a released position withdrawn from said one opening to permit extension and retraction of said segments;

moving said toggle in one direction to the released position by moving a release member from a first position to a second position and exerting a lifting force on said support arm while said handle portion is in said deployed position;

then lessening said lifting force sufficiently to retract at least one of said segments in relation to another segment and achieve a first preselected length for the support arm;

returning said release member to the first position; and then returning said toggle to the engaged position in another of said series of openings while the handle is in the deployed position to lock the segments against further retraction; and (b) increasing the length of said support arm by:
moving the handle portion from the stored position to the deployed position to remove said operative engagement of the handle with the toggle;

exerting said lifting force on the deployed handle portion to extend said one segment in relation to the other segment, said toggle pivotally entering and withdrawing from successive ones of said series of openings as said one segment is extended in relation to the other segment; and removing said lifting force when a second preselected length of the support arm is achieved with said toggle inserted in one of said openings.

15. The process as set forth in claim 14, including the step of exerting a biasing force on the toggle to automatically return said toggle to the engaged position when the release member is returned to the first position.

16. The process as set forth in claim 14, including returning the handle to the stored position to block movement of said toggle in said one direction to restrict extension of said segments.

17. The process as set forth in claim 14, wherein the step of increasing the length of support arm by exerting the lifting force on the deployed handle portion includes the step of exerting the lifting force while said release member is in the first position.

18. The process as set forth in claim 14, wherein the step of increasing the length of the support arm by exerting the lifting force on the deployed handle portion includes the step of exerting the lifting force while the release member is in the second position.

* * * * *